Patented Oct. 29, 1929

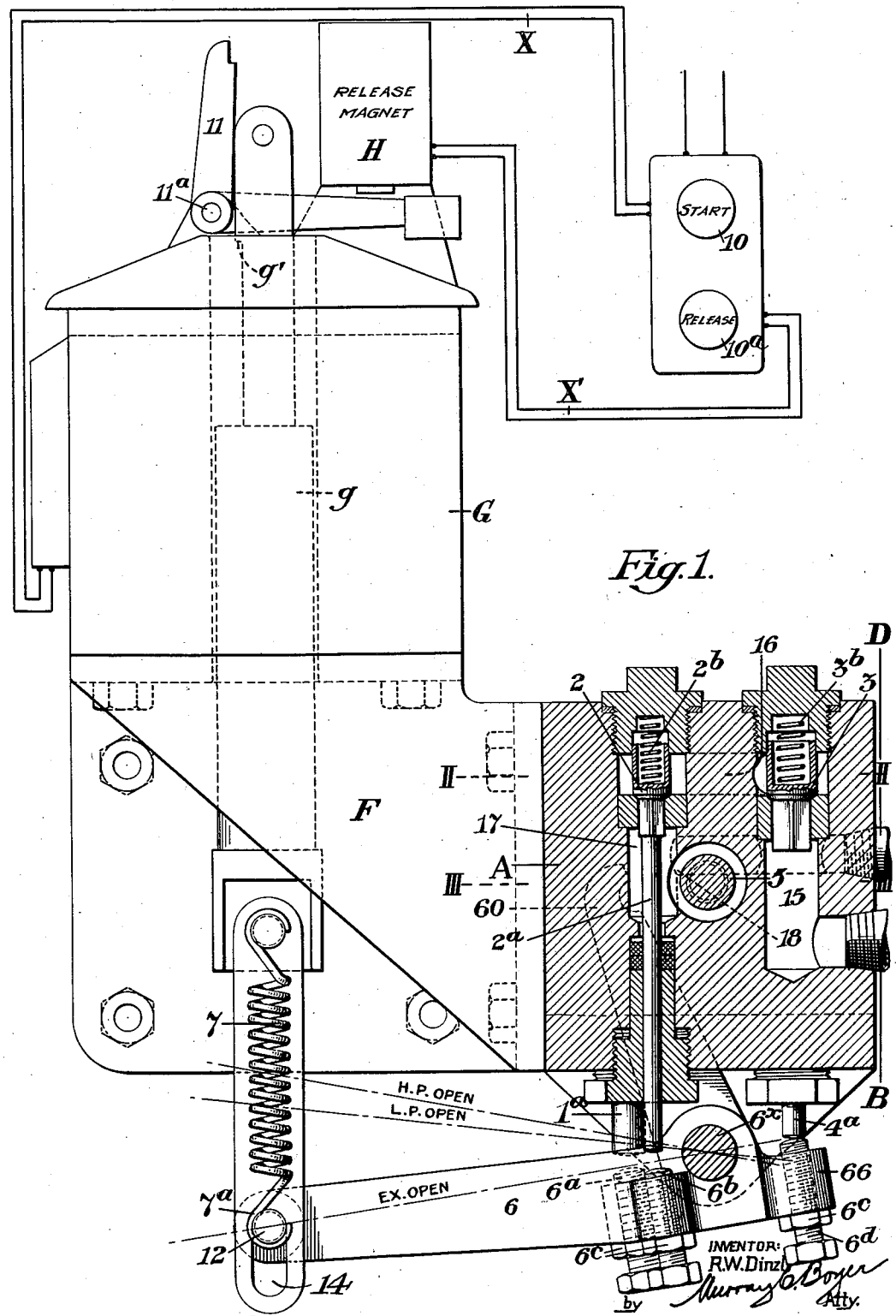

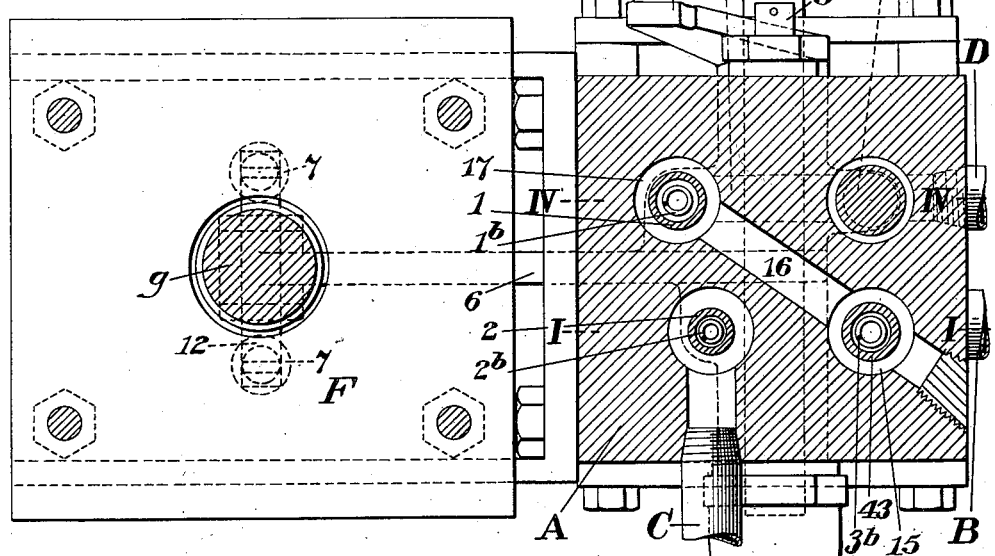
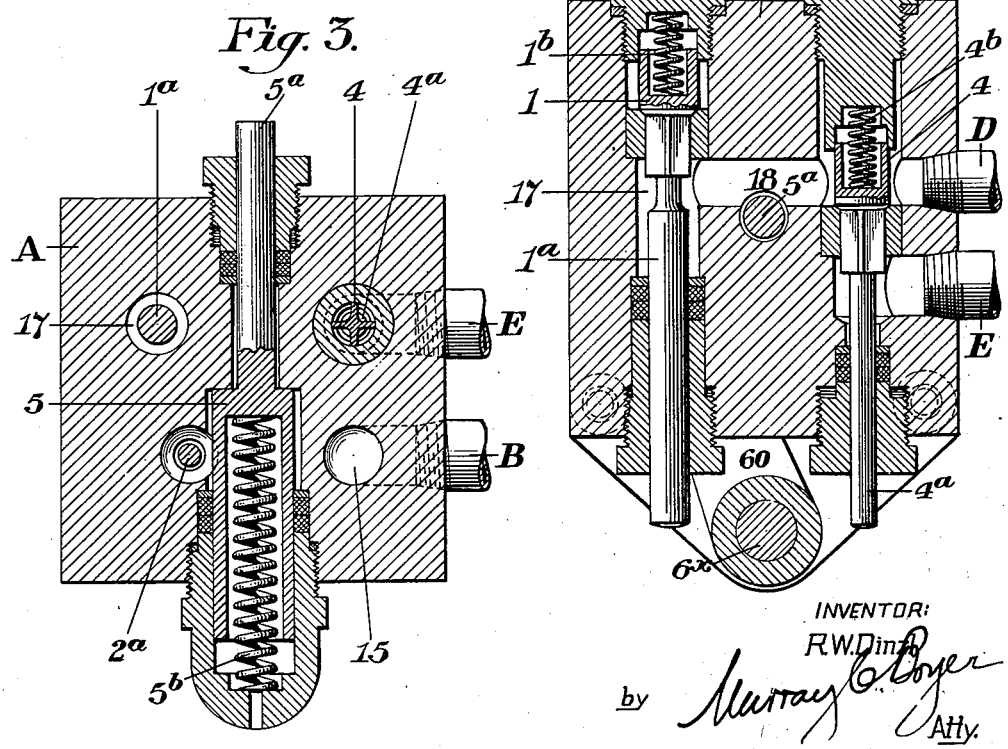

1,733,784

UNITED STATES PATENT OFFICE

RICHARD W. DINZL, OF BYWOOD, PENNSYLVANIA, ASSIGNOR TO SOUTHWARK FOUNDRY & MACHINE COMPANY, OF PHILADELPHIA, PENNSYLVANIA, A CORPORATION OF PENNSYLVANIA

VALVE STRUCTURE

Application filed September 13, 1926. Serial No. 135,254.

My invention relates to valves designed for the purpose of controlling high and low pressures; such valves being applicable for the control of pressure to hydraulic presses where the large volume low pressure is first employed to raise the platen of the press, and the high pressure is subsequently employed to effect the desired pressing operation, and wherein the admission of such high pressure immediately follows the building up of the low pressure.

One object of my invention is to provide simple and effective means for operating the valve for the admission of low pressure.

A further object of my invention is to provide a structure wherein the admission of the high pressure takes place upon an automatic operation of a part of the valve structure after the low pressure has built up to a certain point.

And a still further object of my invention is to provide electrically controlled means for operating the valve structure for the admission of the respective pressures, and for opening the same to exhaust.

For these and other features of my invention, more fully described hereinafter, reference may be had to the accompanying drawings, in which:

Figure 1, is a view in elevation of my improved valve structure, partly in section on the line I—I, Fig. 2.

Fig. 2, is a sectional plan view of the valve structure on the line II—II, Fig. 1.

Fig. 3, is a sectional plan view on the line III—III, Fig. 1, and

Fig. 4, is a sectional elevation on the line IV—IV, Fig. 2.

The valve casing is indicated at A, to which are connected pipes B and C, admitting low and high pressures, respectively; a pipe D leading to the machine, and a pipe E, leading to exhaust. The valve casing A may be connected to or supported by a bracket F, which also supports a solenoid magnet G, and a release magnet H, hereinafter described.

Within the casing A, I provide valves 1, 2, 3 and 4, and a plunger 5, lying in a plane substantially at right angles to the axes of the valves. The valve casing carries a lever 6, pivotally mounted at $6^x$, and controlling operation of the valves 1, 2 and 4, through the medium of the solenoid G, and its core $g$, which is connected to said lever, and a spring 7 interposed between said core and the lever 6. The valve 3 is automatic in its action; opening upon the inlet of low pressure and closing when exhaust takes place, while the plunger 5, which is designed to arrest the movement of the lever 6, temporarily, is also automatic in its action; being moved to a position permitting release of the lever 6, when the low pressure builds up in the machine to the desired degree, as hereinafter described.

Upon pressing a button 10, closing an electrical circuit X, the solenoid G, is energized and the core of the same, indicated at $g$, is lifted. As soon as the push button 10 is released after lifting of the core $g$, the solenoid G becomes deenergized but is prevented from dropping by a latch lever 11, pivoted at $11^a$, which engages a shoulder $g'$ of the core $g$. The lower end of this core is connected to one end of the coil spring (or springs) 7, whose opposite end $7^a$, is connected to a pin 12, carried by the lever 6, which is pivotally hung from a pin or shaft $6^x$, supported by the valve casing A, and upon the lifting of said core, the valves 1 and 2, may be lifted from their seats by positive contact of said lever 6, with their stems $1^a$ and $2^a$; the valve 1, controlling the inlet of low pressure, and the valve 2, controlling the inlet of high pressure to the machine; an hydraulic press, or the like. The lever 6 is provided with adjustable screws $6^a$ and $6^b$, with lock nuts $6^c$; such screws engaging the valve stems $1^a$ and $2^a$, so that the amount of opening of the respective valves may be nicely adjusted to insure the desired opening and at the proper time.

The plunger 5, disposed within the valve casing A, has a stem $5^a$, which projects through and beyond one wall of the valve casing. The lever 6 has an arm 60, which contacts with this stem $5^a$ when moved under the influence of the solenoid; thereby restricting the amount of movement of said lever. When the solenoid core is lifted, the lever 6 is raised until its arm 60 contacts with the stem $5^a$ of the plunger 5. The solenoid continues to move until the lower end of a slot 14, in the lower end of the same engages the pin 12, carried by the lever 6 and connected to the spring (or springs) 7, and the latter will be stretched to a slight extent.

The valve 1 having been opened by movement of the lever 6, through engagement of the screw 6$^a$ with its stem 1$^a$, pressure flows from the supply pipe B, past the self-closing check-valve 3, through passage 16, past valve 1, which is then open, thence through passages 17 and 18, to the pipe D, leading to the machine. As the low pressure builds up in the machine, it reacts upon the horizontally disposed plunger 5, and the latter is moved thereby to an extent sufficient to release the arm 60, of the lever 6, and under the influence of the spring or springs 7, which contract, said lever 6 is further moved to a position where its set screw 6$^b$, can act upon the stem 2$^a$ of the valve 2, controlling the admission of high pressure, which passes from the pipe C, past valve 2, and then via the passages 17 and 18, and pipe D, thence to the machine, for the desired increase of pressure. During this period of high pressure inlet, the arm 60 of the lever 6 rests against the end of the stem 5$^a$ of the plunger 5, and prevents movement of said plunger until it is desired to exhaust the pressure from the machine.

To exhaust the pressure from the machine through the valve structure, the solenoid core $g$ must be released and permitted to drop. For this purpose the latch lever 11, in engagement with the shoulder $g'$ of this core, is tripped, and this action may be effected by hand or by any suitable means, mechanically or electrically controlled. In the present instance I have shown a release magnet H, in the form of a small solenoid disposed adjacent to said latch lever and connected in a second circuit X', and when this solenoid is energized upon the closing of said circuit by pressing a second button 10$^a$, the latch lever 11 is released and the core $g$ drops. Following this action, the lever 6 assumes its original position, shown in Fig. 1; the arm 60 moving away from the end of the stem 5$^a$, and valve 2 closes and shuts off pressure, and spring 5$^b$ to act upon and move the horizontally disposed plunger 5, to its seat. As the lever 6 moves downward, the valve 2 closes first and cuts off the passage of high pressure to the machine, while the pressure within the passages of the valve structure will act upon the stem 1$^a$, of the valve 1, which stem is relatively large, and cause the latter to force down the lever 6, to its normal position.

The lever 6 has an extension 66, provided with an adjustable screw 6$^d$, having the usual lock nut 6$^e$, which screw contacts with the stem 4$^a$ of the exhaust valve 4, when the lever 6 is lowered, and upon the opening of the latter valve the pressure from the machine passes to the exhaust pipe E; said valve 4 being maintained in the open position by said extension 66 until it is necessary to again cause the operation of the valve mechanism to introduce pressure to the machine by pressing the button 10, to close the circuit X, and energize the solenoid G.

The several valves 1, 2, 3 and 4, are normally held to their seats by light springs 1$^b$, 2$^b$, 3$^b$ and 4$^b$; the valves 1, 2 and 4, being positively unseated by the lever 6, while the valve 3, is unseated by the entrance of the low pressure. The plunger 5 is held in position to arrest movement of the lever 6 by the light spring 5$^b$, and is moved against the pressure of this spring when the low pressure builds up in the machine to a predetermined amount.

I claim:

1. In apparatus for controlling the passage of high and low pressures to hydraulic apparatus, the combination of a valve casing, a plurality of valves disposed in said casing, a lever for operating certain of said valves, a solenoid magnet having a core for actuating said lever in one direction, means for energizing said solenoid, a plunger disposed in said casing and operating automatically when low pressure builds up; said plunger having a stem which acts as a stop for said lever and releasing the latter when pressure builds up to a predetermined amount, a latch for supporting the core of said solenoid in the elevated position when said solenoid is deenergized, and means for releasing said latch.

2. In apparatus for controlling the passage of high and low pressures to hydraulic apparatus, the combination of a valve casing, a plurality of valves disposed in said casing, a lever for operating certain of said valves, a solenoid magnet having a core for actuating said lever in one direction, means for energizing said solenoid, a plunger disposed in said casing and operating automatically when low pressure builds up; said plunger having a stem which acts as a stop for said lever and releasing the latter when pressure builds up to a predetermined amount, a latch for supporting the core of said solenoid in the elevated position when said solenoid is deenergized, and electrically actuated means for releasing said latch.

3. In apparatus for controlling the passage of high and low pressures to hydraulic apparatus, the combination of a valve casing, a plurality of valves disposed in said casing, a lever for operating certain of said valves, a solenoid magnet for actuating said lever in one direction, means for energizing said solenoid, a plunger disposed in said casing and operating automatically when low pressure builds up; said plunger having a stem which normally acts as a stop for said lever and releasing the latter when it moves upon the building up of the pressure, means for supporting the core of said solenoid in the elevated position when said solenoid is deenergized, a magnet for releasing said supporting means, and a switch-controlled electric circuit for energizing said release magnet.

4. In apparatus for controlling the passage of high and low pressures to hydraulic apparatus, the combination of a valve casing, a plurality of valves disposed in said casing, a lever for operating certain of said valves, a solenoid magnet for actuating said lever in one direction, means for energizing said solenoid, a plunger disposed in said casing and operating automatically when low pressure builds up; said plunger acting as a stop for said lever and releasing the latter when it moves upon the building up of pressure, a latch for supporting the core of said solenoid in the elevated position when said solenoid is deenergized, a release magnet for said latch, and a switch-controlled electric circuit for energizing said release magnet.

5. In apparatus for controlling the passage of high and low pressures to hydraulic apparatus, the combination of a valve casing, a plurality of valves disposed in said casing, a lever for operating certain of said valves, a solenoid for actuating said lever; said solenoid having a core in operative engagement with the lever, a plunger automatically operating when the pressure builds up; said plunger acting as a stop for the lever and releasing the latter when said plunger is actuated by the building up of the pressure, and the valve for admitting high pressure being operated by the lever when the latter is released, a latch for supporting the core of the solenoid in the elevated position when the latter is deenergized, means for releasing said latch, and a switch-operated electric circuit for energizing said solenoid.

6. In apparatus for controlling the passage of high and low pressures to hydraulic apparatus, the combination of a valve casing, a plurality of valves disposed in said casing, a lever for operating certain of said valves, a solenoid for actuating said lever in one direction; said solenoid having a core in operative engagement with the lever, a plunger operating automatically when the pressure builds up; said plunger acting as a stop for temporarily arresting the movement of said lever and releasing the latter when said plunger is actuated by the building up of the pressure, and the valve for admitting high pressure being operated by the lever when the latter is released and reaches the limit of its movement, a latch for supporting the core of the solenoid in the elevated position, a release magnet for said latch, and switch-operated electric circuits for energizing said solenoid and release magnet.

7. In apparatus for controlling the passage of high and low pressures to hydraulic apparatus, the combination of a valve casing, a plurality of valves disposed in said casing, a pivotally mounted lever for operating certain of said valves, a solenoid magnet for rocking said lever; the latter operating two of said valves in succession when rocked in one direction and one of said valves when rocked in the opposite direction, a plunger operating automatically when low pressure builds up to a predetermined amount; said plunger having a normally projecting stem acting as a stop for said lever and releasing the latter when said plunger is operated, means for energizing said solenoid, a latch for supporting the solenoid core in the elevated position, and means for releasing said latch.

8. In apparatus for controlling the passage of high and low pressures to hydraulic apparatus, the combination of a valve casing, a plurality of valves disposed in said casing, a pivotally mounted lever for operating certain of said valves, a solenoid magnet for rocking said lever; the latter operating two of said valves in succession when rocked in one direction and one of said valves when rocked in the opposite direction, an arm carried by said lever, a plunger operating automatically when low pressure builds up to a predetermined amount; said plunger having a normally projecting stem acting as a stop for said lever by engagement with its arm and releasing the latter when said plunger is operated and the arm moves into position to hold said automatically operating plunger in the changed position, means for energizing said solenoid, a latch for supporting the solenoid core in the elevated position, a release magnet for said latch, and a switch-controlled electric circuit for energizing said release magnet to cause the latch to disengage the solenoid core.

9. The combination, in valve mechanism for controlling the passage of high and low pressures to hydraulic apparatus, of a casing, a plurality of valves mounted in said casing, a lever for actuating certain of said valves, a solenoid for actuating said lever, means for energizing said solenoid, means for holding the core of the solenoid in the elevated position, means for temporarily arresting the movement of said lever when actuated by the solenoid; said means being released when the low pressure builds up, means for effecting final movement of said lever whereby the valve controlling high pressure may be actuated, and means for releasing the latch supporting the core of the solenoid.

10. The combination, in valve mechanism for controlling the passage of high and low pressures to hydraulic apparatus, of a casing, a plurality of valves mounted in said casing, a lever for actuating certain of said valves, a solenoid for actuating said lever in one direction, means for energizing said solenoid, means for holding the core of the solenoid in the elevated position, means for temporarily arresting the movement of said lever when actuated by the solenoid, said means being released when the low pressure builds up, a spring for effecting final movement of said lever whereby the valve controlling high pressure may be actuated, and means for releasing the latch supporting the core of the solenoid.

11. The combination, in valve mechanism for controlling the passage of high and low pressures to hydraulic apparatus, of a casing, a plurality of valves mounted in said casing including a low pressure valve, a high pressure valve, and an exhaust valve, an automatically operating plunger actuated when the low pressure builds up, a lever for actuating said low pressure and high pressure valves in succession; said automatically operating plunger having a projecting stem to temporarily arrest the movement of the lever, an arm carried by said lever and engaged by said stem; said arm moving into alignment with said stem when released and the lever continuing its movement to actuate the high pressure valve, means for effecting this latter movement of the lever, a solenoid for effecting movement of the lever in one direction, means for energizing said solenoid, a pivoted latch for supporting the selonoid core in the elevated position, means for releasing said latch; said lever moving in the opposite direction to permit closing of the valves controlling low and high pressure and releasing the stem of the automatically operating plunger when the core of the solenoid drops, and means carried by said lever for actuating the exhaust valve when said lever is restored to its normal position.

12. The combination, in valve mechanism for controlling the passage of high and low pressures to hydraulic apparatus, of a casing, a plurality of valves mounted in said casing including a low pressure valve, a high pressure valve, and an exhaust valve, an automatically operating plunger actuated when the low pressure builds up, a lever for actuating said low pressure and high pressure valves in succession; said automatically operating plunger having a projecting stem to temporarily arrest the movement of the lever, an arm carried by said lever and engaged by said stem; said arm moving into alignment with said stem when released and the lever continuing its movement to actuate the high pressure valve, a spring for effecting this latter movement of the lever, a solenoid for effecting initial movement of the lever in one direction, means for energizing said solenoid, a pivoted latch for supporting the solenoid core in the elevated position, means for releasing said latch including a release magnet, means for energizing said release magnet independently of the energization of said solenoid; said lever moving in the opposite direction to permit closing of the valves controlling low and high pressure and releasing the stem of the automatically operating plunger when the core of the solenoid drops, and a projection on said lever for actuating the exhaust valve when said lever is restored to its normal position.

13. The combination of a casing having connections from sources of high and low pressure, a connection leading to mechanism actuated by such pressures and an exhaust connection, a valve controlling low pressure, a valve controlling high pressure, a lever for actuating said valves in succession, means for operating said lever, means for temporarily arresting the movement of said lever between the actuation of the low pressure valve and the actuation of the high pressure valve; said arresting means being automatically released upon the building of low pressure to a predetermined degree and permitting further movement of said lever, auxiliary means for automatically completing the movement of said lever, and an exhaust valve closing automatically when the lever is moved to open the valve controlling low pressure.

14. The combination of a casing having connections from sources of high and low pressure, a connection leading to mechanism operated by such pressures and an exhaust connection, a valve controlling low pressure, a valve controlling high pressure, a lever for actuating said valves in succession, means for operating said lever, fluid-operated means for temporarily arresting the movement of said lever between the actuation of the low pressure valve and the actuation of the high pressure valve; said arresting means being automatically released upon the building up of the low pressure to a predetermined degree and permitting further movement of said lever, auxiliary means for automatically completing the movement of said lever, an exhaust valve closing automatically when the lever is moved to open the valves controlling low and high pressures, and means permitting the lever to be restored to its initial position; restoration to such position causing said lever to open the exhaust valve.

15. The combination, in mechanism for controlling the passage of low and high pressures to hydraulic apparatus, of a casing, a plurality of valves mounted in said casing, a lever for operating said valves to open position, means for automatically actuating said lever to open said valves, means for temporarily arresting the movement of said lever when moving in one direction; said means being released when the low pressure builds up to a predetermined degree and automatically permitting further movement of the lever, and means for releasing said lever whereby it may automatically return to the inactive position and permit the valves to close.

16. The combination, in mechanism for controlling the passage of low and high pressure to hydraulic apparatus and exhaust therefrom, of a casing, a plurality of valves mounted in said casing, an automatically actuated lever for operating all of said valves to open position, a solenoid for lifting said lever; said movement permitting the exhaust valve to close and opening the low and high pressure controlling valves successively, means for temporarily arresting the movement of said lever when moving in one direction; said means being released when the low pressure builds up to a predetermined degree and permitting further movement of said lever, and means for releasing the core of the solenoid operatively connected to said lever whereby the latter may move to permit the low and high pressure valves to close and open the exhaust valve.

17. The combination, in mechanism for controlling the passage of low and high pressure to hydraulic apparatus and exhaust therefrom, of a casing, a plurality of valves mounted in said casing, a rocking lever for operating said valves to open position; said lever actuating a plurality of valves in succession when rocked in one direction and a single valve when rocked in the opposite direction, means for automatically closing said valves when released from operative engagement with said lever, means for effecting intermittent action of said lever in one direction, means for temporarily arresting such movement of said lever; said means being released when pressure builds up to a predetermined degree and permitting further movement of said lever, means for supporting said lever following such actuation, and means for releasing said lever whereby the valves opened in succession may automatically close successively in the reverse order and the single valve may be opened by said lever.

18. The combination, in mechanism for controlling the passage of low and high pressures to hydraulic apparatus, of a casing, a plurality of valves mounted in the same, a rocking lever for operating said valves to open position; said lever actuating a plurality of valves in succession when rocked in one direction and a single valve when rocked in the opposite direction, means for closing said valves when relieved from operative engagement with said lever, a solenoid for actuating said lever in one direction, a releasable latch for supporting said lever following such actuation, means for temporarily stopping the movement of said lever when rocked in the direction to operate said valves in succession; said means being released when pressure builds up to a predetermined amount and permitting complete movement of said lever, and means for releasing the latch supporting said lever whereby the valves opened in succession may close in reverse order and the single valve may be opened by said lever.

19. In apparatus for controlling the passage of low and high pressures to hydraulic apparatus, the combination of a valve casing, a plurality of valves disposed in said casing, a lever for operating certain of said valves, a solenoid magnet having a core for actuating said lever in one direction, means for energizing said solenoid, a plunger disposed in said casing and operating automatically when low pressure builds up; said plunger having a stem which acts as a stop for said lever and releasing the latter when pressure builds up to a predetermined degree, and means for releasing said solenoid to permit actuation of said lever in the opposite direction.

20. The combination of a casing, connections from sources of low and high pressures and a connection leading to mechanism actuated by such pressures, a valve controlling low pressure, a valve controlling high pressure, a lever for actuating said valves in succession, means for operating said lever, means for temporarily arresting the movement of said lever between the actuation of the low pressure valve and the actuation of the high pressure valve; said arresting means being automatically released upon the building up of low pressure to a predetermined degree, auxiliary means for completing the movement of the lever, and an exhaust valve closing automatically when the lever is moved to open the valves controlling low and high pressure.

In witness whereof I have signed this specification.

RICHARD W. DINZL.